United States Patent [19]
Ramakrishnan et al.

[11] Patent Number: 6,114,968
[45] Date of Patent: Sep. 5, 2000

[54] HYBRID CONTENTION/POLLING ACCESS METHOD

[75] Inventors: Krishnan Ramakrishnan, Ashland; Stephen Schroeder, Avon; John A. Perreault, Hopkinton, all of Mass.

[73] Assignee: Motorola Inc., Schaumburg, Ill.

[21] Appl. No.: 08/883,972

[22] Filed: Jun. 27, 1997

[51] Int. Cl.[7] ...................................... H04Q 9/00
[52] U.S. Cl. .................. 340/825.08; 340/825.5; 340/825.06; 340/825.07; 340/825.52; 370/433; 370/445; 370/447; 370/449; 370/346; 710/109; 709/225
[58] Field of Search ............... 340/825.08, 825.5, 340/825.06, 825.07, 825.52; 395/289, 200.55; 370/433, 346, 445, 447, 449; 710/109; 709/225

[56] References Cited

U.S. PATENT DOCUMENTS 3,755,781  8/1973  Haas et al. .................. 340/825.08
4,829,297  5/1989  Ilg et al. ..................... 340/825.08
5,598,150  1/1997  Suzuki et al. ................. 340/825.07

*Primary Examiner*—Brian Zimmerman
*Assistant Examiner*—Yves Dalencourt
*Attorney, Agent, or Firm*—Jeffrey T. Klayman; Terri S. Hughes; Joanne N. Pappas

[57] ABSTRACT

A system, device, and method for improving access in a hybrid contention/polling protocol maintains a list of active users, a list of recently active users, and a list of inactive users. An active user that becomes inactive is moved into the list of recently active users, and a recently active user that remains inactive is moved into the list of inactive users. A limited contention poll addressed to a number of inactive users and at least one recently active user authorizes any of the addressed users to contend for access to the shared channel. Upon detection of a collision, addressed users that are in the list of recently active users are polled individually, while the inactive users are sent a collision resolution poll which forces the inactive users to contend again for access. Users that become active are moved into the list of active users.

16 Claims, 11 Drawing Sheets

(100) - PRIOR ART

HYBRID CONTENTION/POLLING ACCESS METHOD

CROSS-REFERENCE TO RELATED APPLICATIONS

This application is related to the following U.S. applications, owned by the same assignee as the assignee of this application and incorporated by reference herein in their entireties:

Method and Apparatus for a Hybrid Limited Contention and Polling Protocol, U.S. Ser. No. 08/437,106, to John A. Perreault, Abhay Joshi, Mete Kabatepe, Lawrence W. Lloyd, and Stephen Schroeder, filed on May 5, 1995 (Attorney Docket Number CX095009); and Improved Hybrid Contention/Polling Access Method, to John A. Perreault and Krishnan Ramakrishnan, filed on even date herewith.

BACKGROUND

1. Field of the Invention

The invention relates generally to communication systems and, more particularly, to multiple access protocols for use over a shared communications medium.

2. Discussion of Related Art

In today's information age, there is an increasing need for high speed communications that provides guaranteed quality of service (QoS) for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that will be employed increasingly in the future is the shared-medium network. A shared medium network is one in which a single communications channel (the shared channel) is shared by a number of end users such that uncoordinated transmissions from different end users may interfere with each other. In modern broadband communications networks, the shared communications channel is typically one of a number of frequency bands carried over a shared physical medium, such as a hybrid fiber-optic/coaxial cable (HFC) network or by electromagnetic waves in free space. Since communications networks typically have a limited number of communications channels, the shared medium network allows many end users to gain access to the network over a single communications channel, thereby allowing the remaining communications channels to be used for other purposes. However, the shared medium network is only feasible when each end user only transmits data intermittently, allowing other end users to transmit during periods of silence.

In the shared medium network, each end user interfaces to the shared channel by means of an Access Interface Unit (AIU) which allows the end user to transmit and receive information via the shared channel. A single AIU may support one or a number of end users. Each end user wishing to utilize the shared channel participates in a Medium Access Control (MAC) protocol which provides a set of rules and procedures for accessing the shared channel. For convenience, each participant in the MAC protocol is referred to as a MAC User.

FIG. 1 is a logical representation of a shared medium network 100 as is known in the art. As illustrated in FIG. 1, a headend unit 110 is coupled to a plurality of AIUs $120_a$ through $120_n$ (collectively referred to as AIUs 120) via a shared channel 130. In the preferred embodiment, the shared channel 130 is one of a number of communications channels carried by a shared physical medium such as an HFC or wireless network. In other embodiments, the shared physical medium may be coaxial cable, fiber-optic cable, twisted pair wires, and so on, and may also include air, atmosphere, or space for wireless and satellite communication. The headend unit 110 is also coupled to a communications network 140, which may include networks such as the Internet, on-line services, telephone and cable networks, and other communication systems.

Continuing to refer to FIG. 1, in the preferred embodiment, the shared physical medium, such as an HFC or wireless network, has or supports a plurality of communications channels. For ease of reference, the communications channels in which a headend unit, such as the headend unit 110, transmits information, signals, or other data to an AIU, such as AIU $120_n$, are referred to as downstream channels. Also for ease of reference, the communications channels in which an AIU, such as AIU $120_n$, transmits information, signals, or other data to a headend unit, such as headend unit 110, are referred to as upstream channels. These various upstream and downstream channels may, of course, be the same physical channel or may be separate physical channels, for example, through time-division multiplexing or frequency-division multiplexing. These various channels may also be logically divided in other ways, in addition to upstream and downstream directions. In the preferred embodiment, the communications medium is an HFC network, with downstream channels in the frequency spectrum (band) typically 50–750 MHz (and up to 1 GHz), and with upstream channels in the frequency spectrum typically 5–42 MHz.

In a simple model of an exemplary HFC network, the headend unit uses a single downstream channel to send information, including poll messages, to the MAC Users, and a single upstream channel is used by the MAC Users to send information to the headend unit. Since the headend unit is the only device which transmits on the downstream channel, the downstream channel is not a "shared channel" as that term is applied to the present invention. However, since multiple MAC Users transmit on the upstream channel, the upstream channel is a shared channel, and the MAC protocol must provide for orderly access to the channel so as to maximize the data throughput over the channel.

A number of different MAC protocols have been developed for use over a shared channel. These protocols can generally be categorized as contention-free protocols, which avoid collisions on the shared channel by means of various scheduling methods, and contention-based protocols, which do not avoid collisions but instead resolve any collisions that do occur on the shared channel. Contention-free protocols, such as time-division multiple access (TDMA) and round-robin polling protocols, are typically less efficient than contention-based protocols under light loads because the contention-free protocols generally allocate some amount of bandwidth to each MAC User whether or not the MAC User has information to send. On the other hand, contention-based protocols only allocate bandwidth to those MAC Users that have information to send, although some amount of bandwidth is wasted whenever collision resolution is required. Thus, the effectiveness of a MAC protocol is generally dependent on the number of MAC Users.

There are many variations of each protocol category. One contention-based MAC protocol uses a single headend unit, situated at a common receiving end of the shared channel and able to transmit messages to all MAC Users sharing the channel, to coordinate access to the shared channel. A hybrid contention/polling technique is used wherein "active" MAC Users are given contention-free access to the channel by individually addressed (select) poll messages, while "inactive" MAC Users are provided opportunities to contend for access to the channel.

In the hybrid contention/polling protocol, the headend unit characterizes each MAC User as either "active" or "inactive" based on the MAC User's responses to poll messages. The headend unit maintains a list of the "active" MAC Users (referred to as the "select poll list") and a list of the "inactive" MAC Users (referred to as the "contention poll list"). In practice, the select poll list may be an aggregate of a number of lists (e.g., an exemplary embodiment splits the select poll list into separate fast poll and medium poll lists which are used to determine the frequency at which the headend unit polls the MAC Users on those lists). The MAC Users on the select poll list are polled individually while the MAC Users on the contention poll list are routinely polled in groups and must contend for access to the shared channel. For convenience, an individually addressed poll message is referred to as a select poll (SPoll) while a group addressed poll message is referred to as a limited contention poll (LCPoll).

The SPoll is individually addressed to a particular MAC User and is intended only for that MAC User. The individually addressed MAC User must respond to the SPoll, while all other MAC Users must ignore the SPoll. The individually addressed MAC User responds to the SPoll by transmitting either a data message, if the MAC User has data to transmit, or a Negative Acknowledgment (NAK), if the MAC User has no data to transmit.

Upon being individually polled by the headend unit, MAC Users on the select poll list that remain "active" (i.e., by transmitting a data message in response to a SPoll within a predetermined interval) are left on the select poll list. However, MAC Users on the select poll list that become "inactive" (i.e., by responding with a NAK to each SPoll received during a predetermined interval) are moved onto the contention poll list and are instructed (either explicitly or implicitly) by the headend unit to respond to LCPolls.

The LCPoll is addressed to a group of MAC Users by specifying in the LCPoll a range of MAC User addresses and a service group identifier. Only MAC Users in the specified group (i.e., having an address in the specified range and being a member of the specified service group) are permitted to respond to the LCPoll. Furthermore, a MAC User in the specified group will only respond to the LCPoll if it has been instructed a priori that it may respond to LCPolls and then only if it has data to transmit.

The responding MAC Users typically transmit a reservation request message rather than a data message in response to the LCPoll. The reservation request message is typically a short duration message which indicates to the headend unit that the MAC User requires bandwidth on the shared channel as well as how much bandwidth is required (which the headend unit provides by sending SPolls to the MAC User). In an exemplary embodiment, the reservation request message is a special NAK message. If exactly one MAC User responds to the LCPoll, then the reservation request message is successfully received by the headend unit, and the responding MAC User is said to have made a reservation. However, if more than one MAC User responds to the LCPoll, then a collision occurs, and the headend unit must resolve the collision by sending LCPolls to successively smaller and smaller subgroups until each MAC User having data to transmit is able to make a reservation.

Upon being group polled, MAC Users on the contention poll list that remain "inactive" (i.e., having no data to transmit) are left on the contention poll list. However, MAC Users on the contention poll list that become "active" (i.e., by making a reservation) are moved onto the select poll list and are instructed (either explicitly or implicitly) by the headend unit to ignore LCPolls.

By moving a MAC User from the select poll list to the contention poll list when the MAC User becomes "inactive," the hybrid contention/polling technique attempts to maintain the select poll list at an optimal level, which aids in the efficient use of select polling. A goal of the hybrid contention/polling technique is to remove MAC Users from the select poll list as early as possible and to react to the needs of the "inactive" MAC Users as quickly as possible. Choosing the predetermined interval equal to one SPoll avoids wasting SPolls on inactive MAC Users, but forces the MAC User to contend anew if it generates data immediately. On the other hand, choosing the predetermined interval greater than one SPoll wastes SPolls on MAC Users that are truly "inactive," but keeps the MAC User "active" in case it generates data again within the predetermined interval. In either case, there are potential inefficiencies if the true state of the MAC User does not match the poll list to which the MAC User is placed. Therefore, a need remains for an improved hybrid contention/polling access method.

DETAILED DESCRIPTION

As discussed above, the need remains for an improved hybrid contention/polling access method. This invention improves access in a hybrid contention/polling protocol by maintaining a third list, referred to as the most-recently-used (MRU) cache list, which contains "inactive" MAC Users that had recently been "active." The "recently active" MAC Users contend for access to the shared channel in response to LCPolls along with "inactive" MAC Users. However, if a collision occurs, the "recently active" MAC Users are selectively polled and do not participate in collision resolution along with the "inactive" users.

In order to participate in the hybrid contention/polling protocol, each MAC User must be able to determine, for each LCPoll, whether or not it has been instructed to respond to LCPolls. Each MAC User therefore maintains a state machine similar to the one shown in FIG. 2. Only MAC Users in the INACTIVE state may respond to the LCPoll, while MAC Users in the ACTIVE state must ignore the LCPoll.

The MAC User state may be controlled explicitly by the headend unit by means of signaling included in each SPoll message. In an exemplary embodiment, a field carried in the SPoll message controls the state transitions of the addressed MAC User. Using this field, the headend unit can command the MAC User to unconditionally transition into (or remain in) the ACTIVE state, to transition into (or remain in) the ACTIVE state only if the MAC User transmits a data message in response to the SPoll, or to transition into (or remain in) the INACTIVE state only if the MAC User transmits a NAK in response to the SPoll.

Alternatively, the MAC User state may be determined implicitly by the MAC User itself according to the availability (or unavailability) of data to transmit. If the MAC User has additional data remaining to be transmitted after responding to an SPoll, then the MAC User transitions into (or remains in) the ACTIVE state. If, however, the MAC User has no additional data remaining to be transmitted after responding to an SPoll, then the MAC User transitions into (or remains in) the INACTIVE state. The latter case is true even if the MAC User transmitted data in response to the SPoll. In an exemplary embodiment, a field carried in each data message transmitted by the MAC User is used by the MAC User to indicate whether or not additional data is available for transmission (and therefore implicitly signals to the headend unit whether the MAC User is in the ACTIVE state or the INACTIVE state). For the purpose of determining the state of the MAC User, an indication by the MAC User that there is no additional data to transmit is typically treated by the headend unit as if a NAK had been received in response to the SPoll.

Figure 3:
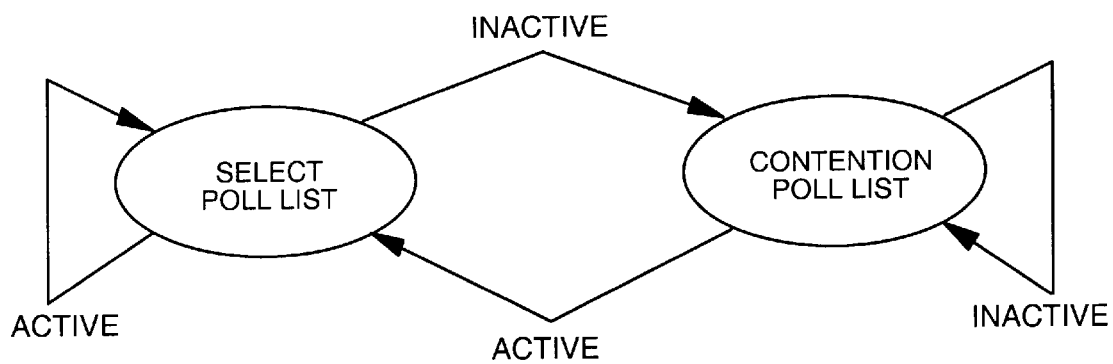
FIG. 3 is a state transition diagram for maintaining the select poll list and the contention poll list as is known in the art.

FIG. 3 shows a state diagram for maintaining the two poll lists in the hybrid contention/polling technique as is known in the art. As described above, MAC Users in the select poll list are selectively polled, and remain in the select poll list as long as they remain "active." A MAC User is considered to be "active" if it transmits a data message in response to a SPoll within a predetermined interval. If a MAC User responds with a NAK each Spoll received during a predetermined interval, then the MAC User is placed in the contention poll list where it participates in contention polling and remains so long as it has no data to transmit. When the MAC User makes a successful reservation in response to a LCPoll, the MAC User is placed back on the select poll list.

Figure 1:
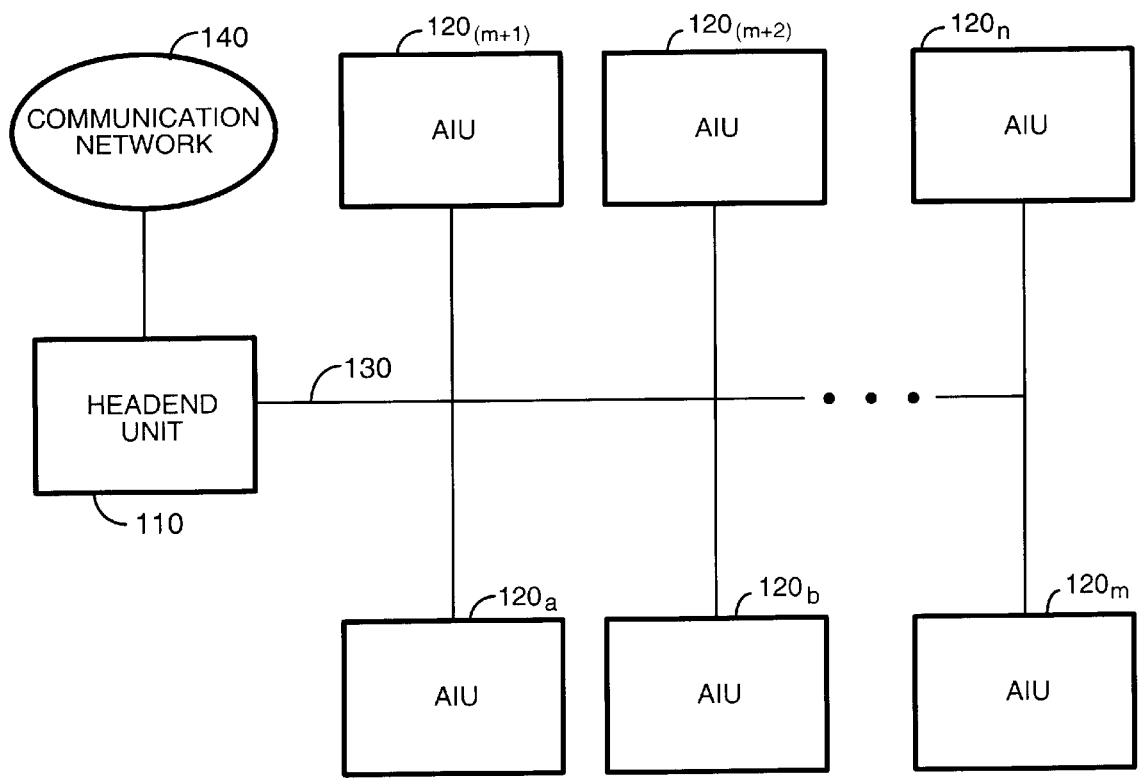
FIG. 1 is a block diagram of a shared medium network as is known in the art.
Figure 2:
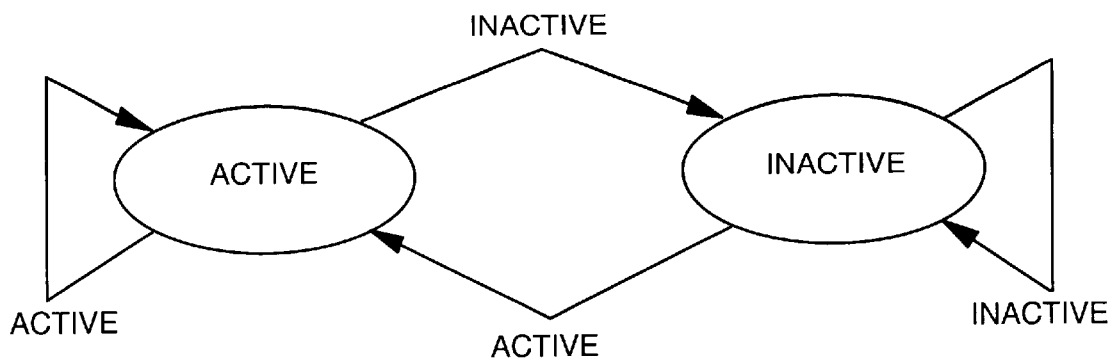
FIG. 2 is a state transition diagram showing the MAC User states as is known in the art.

The states in the MAC User state machine shown in FIG. 2 correspond generally to the two poll lists maintained by the headend unit. As described above, the MAC User may be moved between the two states at the direction of the headend unit, using signaling included in each SPoll. In this embodiment, the headend unit includes a poll mode transition field in each SPoll message which controls the state transitions of the MAC User. In an exemplary embodiment, the poll mode transition field is a two bit field in the SPoll message. When the poll mode transition field is set by the headend unit to the value "00," the MAC User unconditionally transitions into (or remains in) the ACTIVE state. When the poll mode transition field is set by the headend unit to the value "10," then the MAC User transitions into (or remains in) the ACTIVE state if the MAC User has data to transmit and transitions into (or remains in) the INACTIVE state if the MAC User has no data to transmit. Since the MAC User transitions into (or remains in) the ACTIVE state if it transmits a data message in response to the SPoll (irrespective of the setting of the poll mode transition field), the effect of the poll mode transition field is to control the MAC User state when the MAC User has no data to transmit.

Logic flow diagrams for an exemplary embodiment are shown in FIGS. 4–8. The logic shown is intended only to facilitate discussion and understanding of the exemplary embodiment and is not intended to fully characterize a protocol implementation. For convenience and clarity, many details of a full protocol implementation are intentionally omitted. Such details will be apparent to a skilled artisan.

Figure 4:
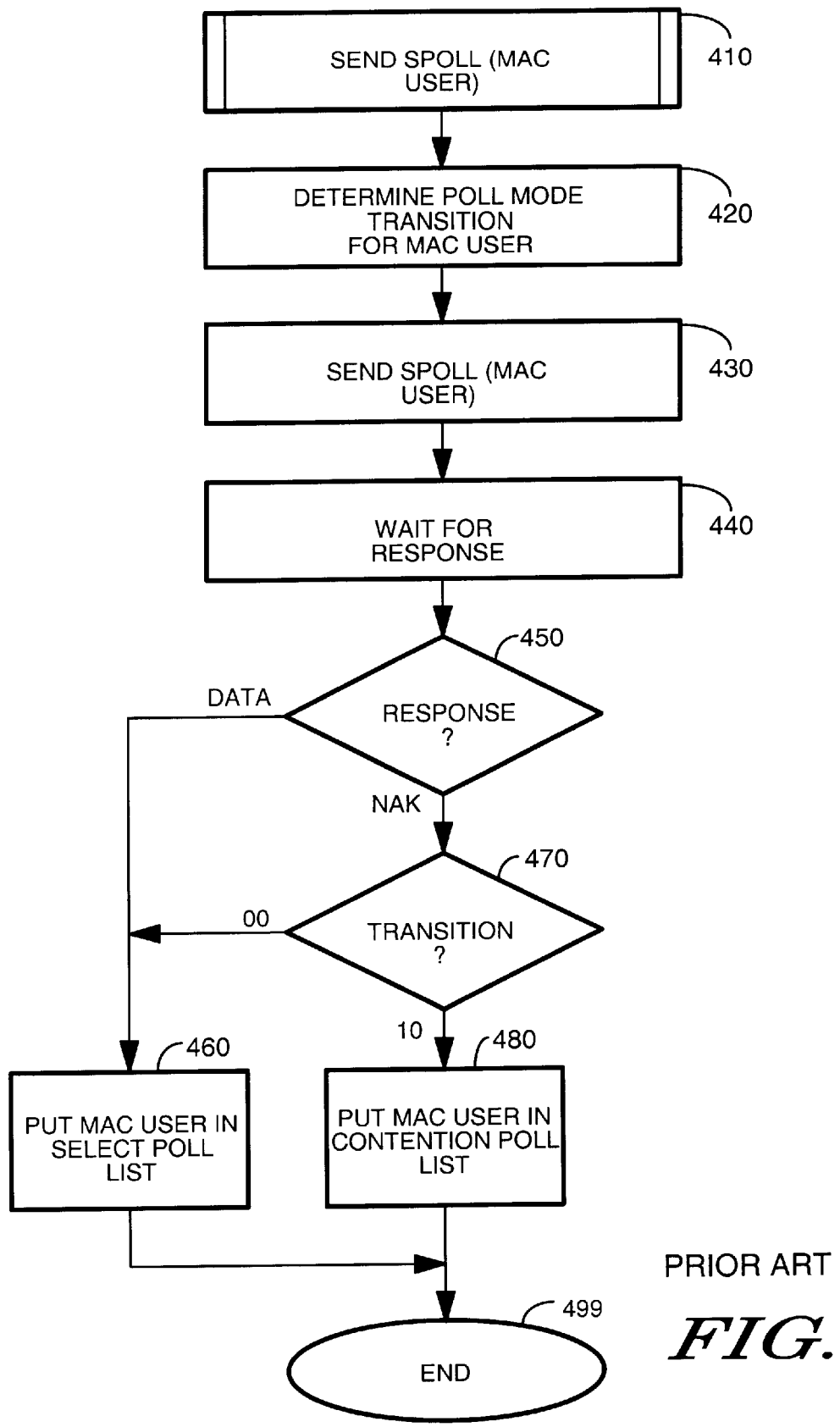
FIG. 4 is a logic flow diagram for sending a SPoll by the headend unit as is known in the art.

FIG. 4 shows logic for sending a SPoll by the headend unit. The logic begins in step 410 and proceeds to determine the poll mode transition field for the MAC User in step 420. The logic sets the poll mode transition field to "00" to instruct the MAC User to unconditionally transition into (or remain in) the ACTIVE state or "10" to instruct the MAC User to transition into (or remain in) the INACTIVE state if the MAC User has no data to transmit. After setting the poll mode transition field in the SPoll, the logic sends the SPoll to the specified MAC User, in step 430, and waits for a response from the MAC User, in step 440. If a data message is received in step 450, then the logic puts the MAC User in the select poll list, in step 460. If a NAK is received in step 450, then the logic checks the poll mode transition field in step 470 to determine the proper list for the MAC User. If the MAC User was instructed to unconditionally transition into (or remain in) the ACTIVE state ("00" in step 470), then the logic puts the MAC User in the select poll list, in step 460. If the MAC User was instructed to transition into (or remain in) the INACTIVE state ("10" in step 470), then the logic puts the MAC User in the contention poll list, in step 480. The logic terminates in step 499.

Figure 5:
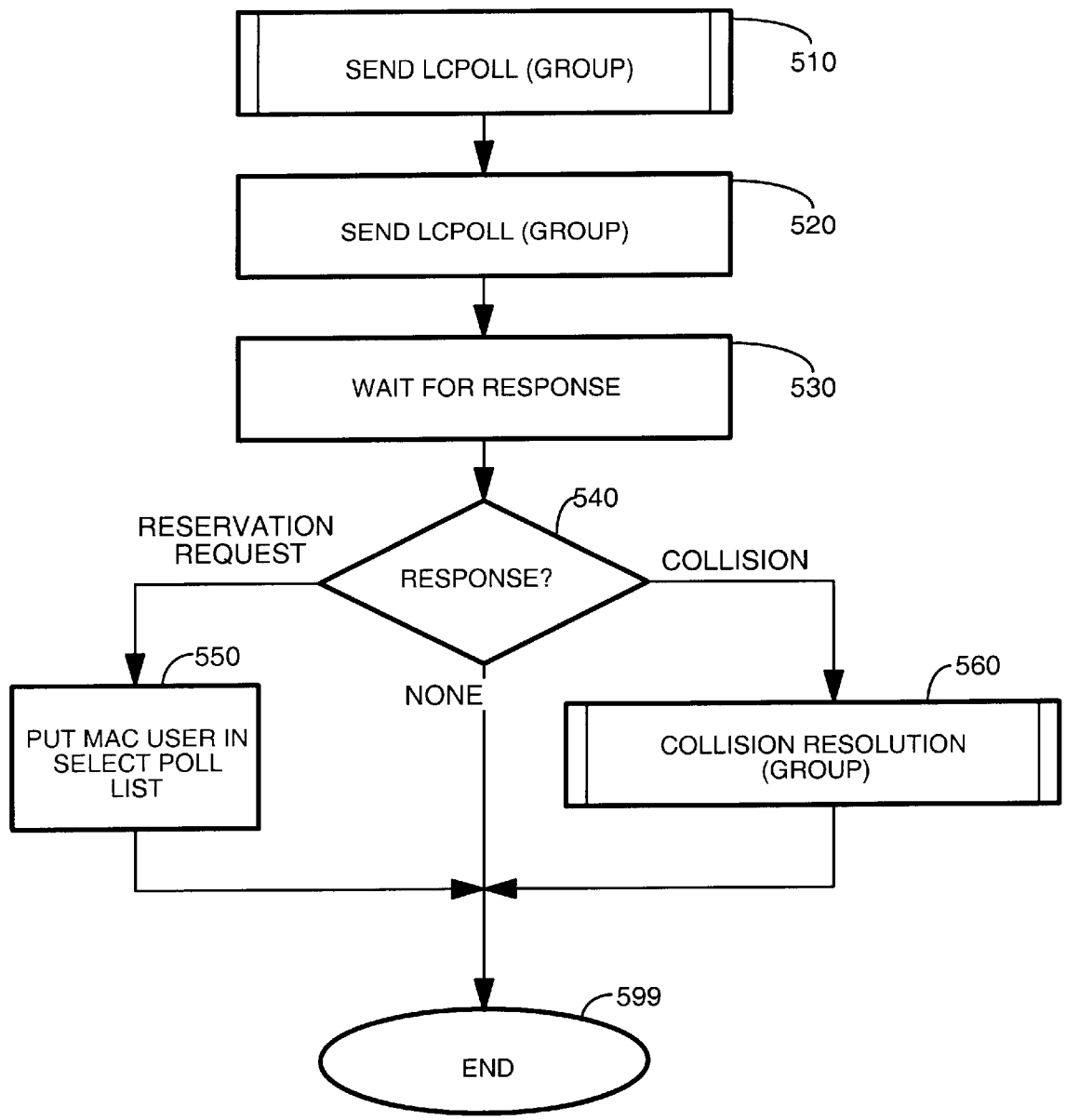
FIG. 5 is a logic flow diagram for sending a LCPoll by the headend unit as is known in the art.

FIG. 5 shows logic for sending a LCPoll by the headend unit. The logic begins in step 510 and proceeds to send the LCPoll addressed to the specified group of MAC Users, in step 520. The logic then waits for a response, in step 530. If a reservation request is received in step 540, then the logic puts the responding MAC User in the select poll list, in step 550. If a collision is detected in step 540, then the logic performs the collision resolution procedure (described in FIG. 6 below) over the specified group of MAC Users. The logic terminates in step 599.

Figure 6:
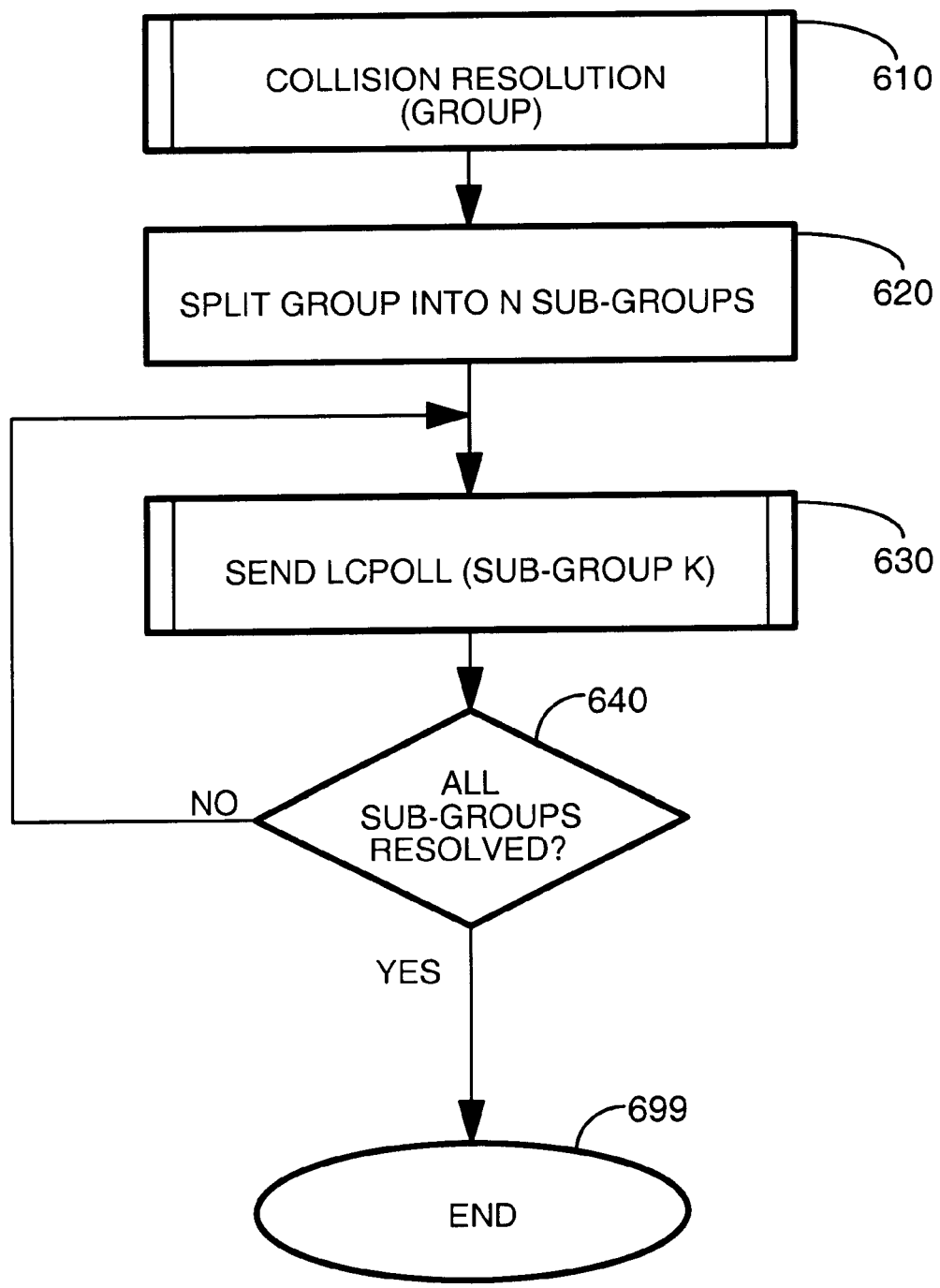
FIG. 6 is a logic flow diagram for collision resolution by the headend unit as is known in the art.

FIG. 6 shows logic for collision resolution by the headend unit. The logic begins in step 610 and proceeds to split the specified group of MAC Users into a predetermined number N of sub-groups, in step 620. Then, for each sub-group k, the logic sends a LCPoll to the sub-group by invoking the logic of FIG. 5, in step 630. When collision resolution for all N sub-groups is complete (YES in step 640), the logic terminates in step 699. It is important to note that a collision in any sub-group k is resolved by invoking the collision resolution logic anew for that sub-group.

Figure 7:
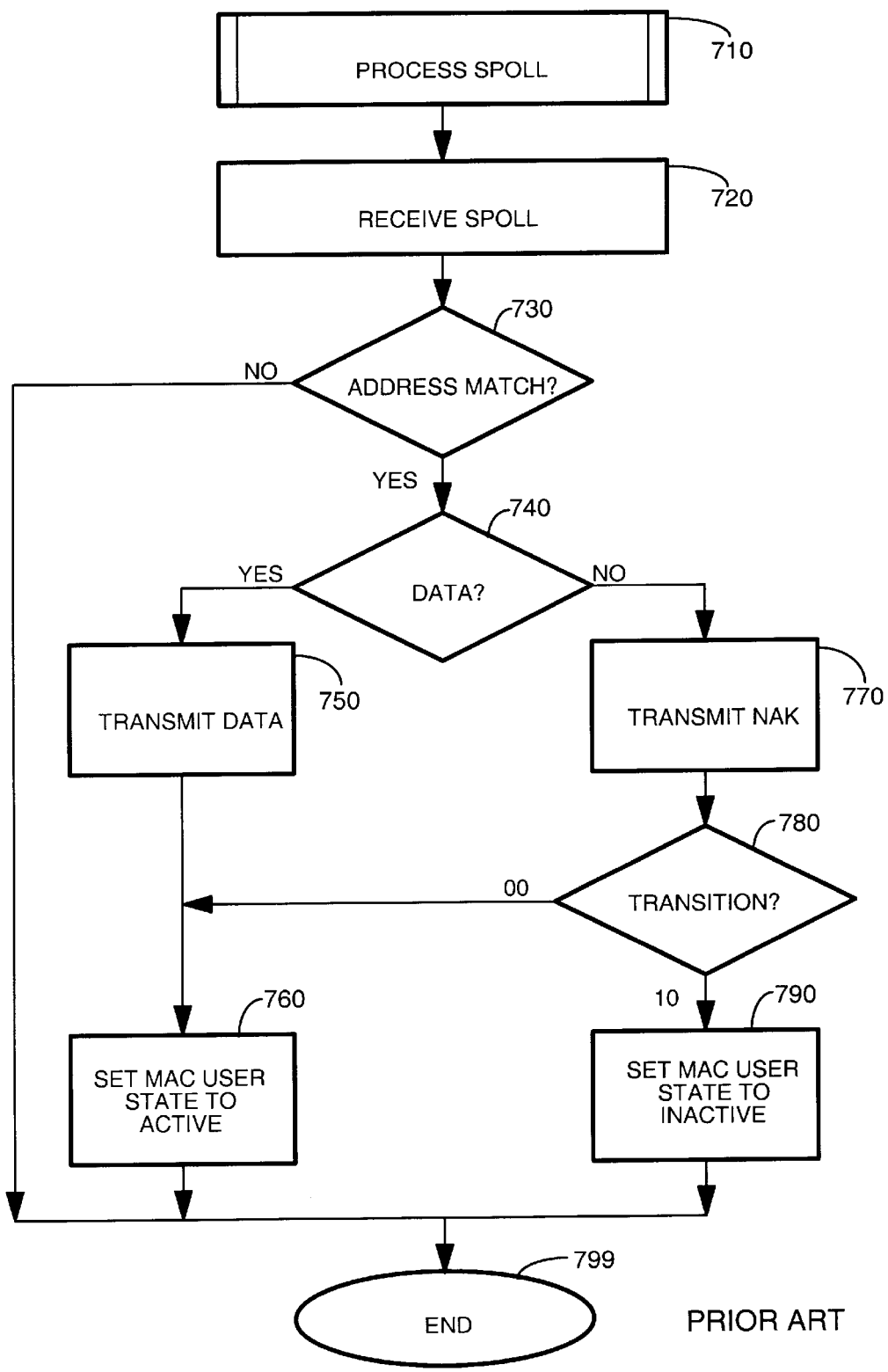
FIG. 7 is a logic flow diagram for processing a SPoll by the MAC User as is known in the art.

FIG. 7 shows logic for processing a SPoll by the MAC User. The logic begins in step 710 and, upon receiving a SPoll in step 720, determines whether or not the MAC User address matches the SPoll address. If the MAC User address does not match the SPoll address (NO in step 730), then the logic terminates in step 799. If the MAC User address matches the SPoll address (YES in step 730), the logic proceeds to step 740 where it determines whether or not there is data to transmit. If there is data to transmit (YES in step 740), then the logic transmits a data message, in step 750, and sets the MAC User state to ACTIVE, in step 760. If there is no data to transmit (NO in step 740), then the logic transmits a NAK, in step 770, and checks the poll mode transition field to determine the MAC User state, in step 780. If the MAC User is instructed to unconditionally transition into (or remain in) the ACTIVE state ("00" in step 780), then the logic sets the MAC User state to ACTIVE, in step 760. If the MAC User was instructed to transition into (or remain in) the INACTIVE state ("10" in step 780), then the logic sets the MAC User state to INACTIVE, in step 790. The logic terminates in step 799.

Figure 8:
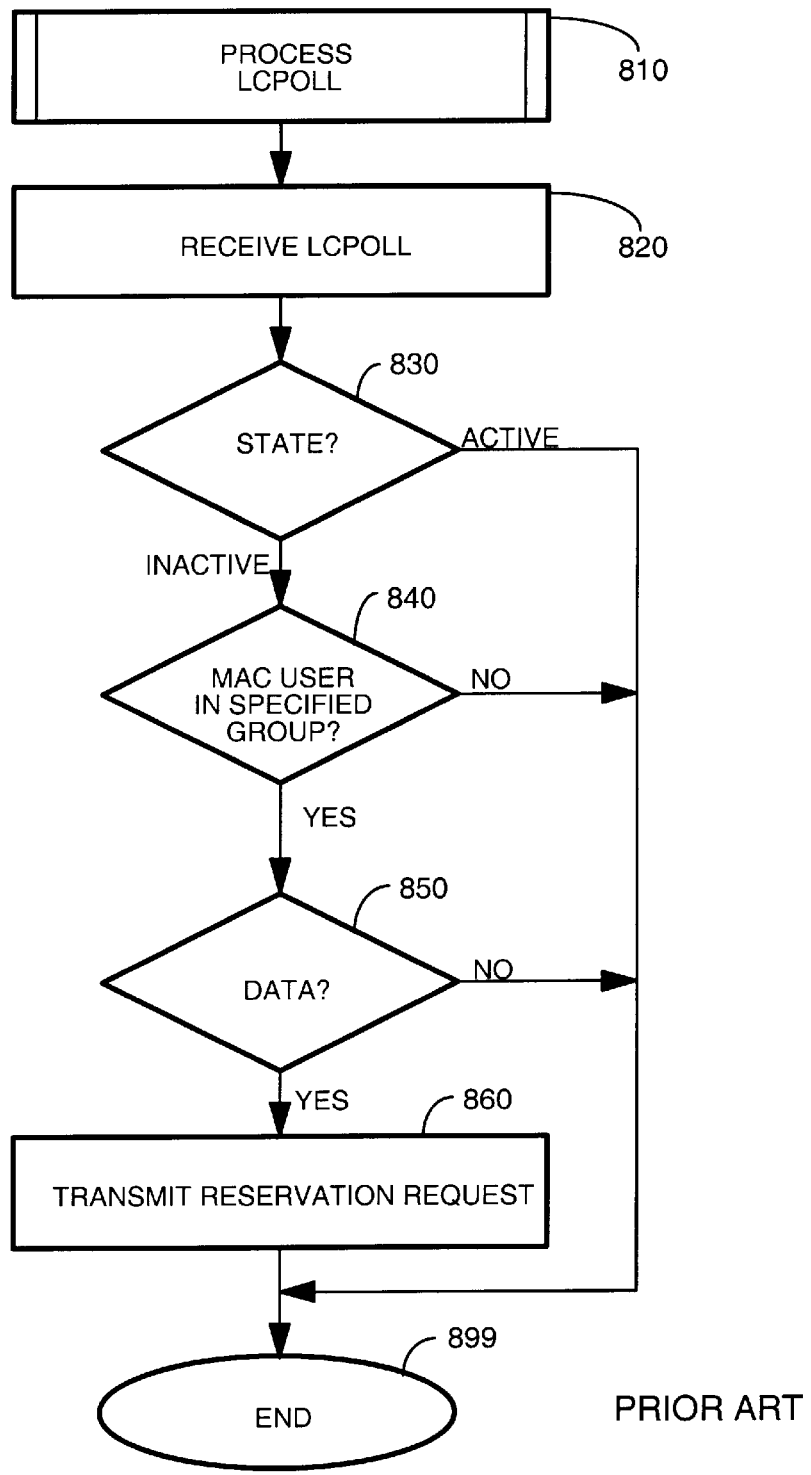
FIG. 8 is a logic flow diagram for processing a LCPoll by the MAC User as is known in the art.

FIG. 8 shows logic for processing a LCPoll by the MAC User. The logic begins in step 810 and, upon receiving a LCPoll in step 820, proceeds to step 830 where it checks the MAC User state to determine whether or not to process the LCPoll. If the MAC User state is ACTIVE in step 830, then the logic terminates in step 899 without processing the LCPoll. If the MAC User state is INACTIVE in step 830, then the logic proceeds to step 840 where it determines whether or not the MAC User is in the specified group. If the MAC User is not in the specified group (NO in step 840), then the logic terminates in step 899. If the MAC User is in the specified group (YES in step 840), then the logic proceeds to step 850 where it determines whether or not there is data to transmit. If there is no data to transmit (NO in step 850, then the logic terminates in step 899 without transmitting. If there is data to transmit (YES in step 850), then the logic transmits a reservation request, in step 860, and terminates in step 899.

Figure 9:
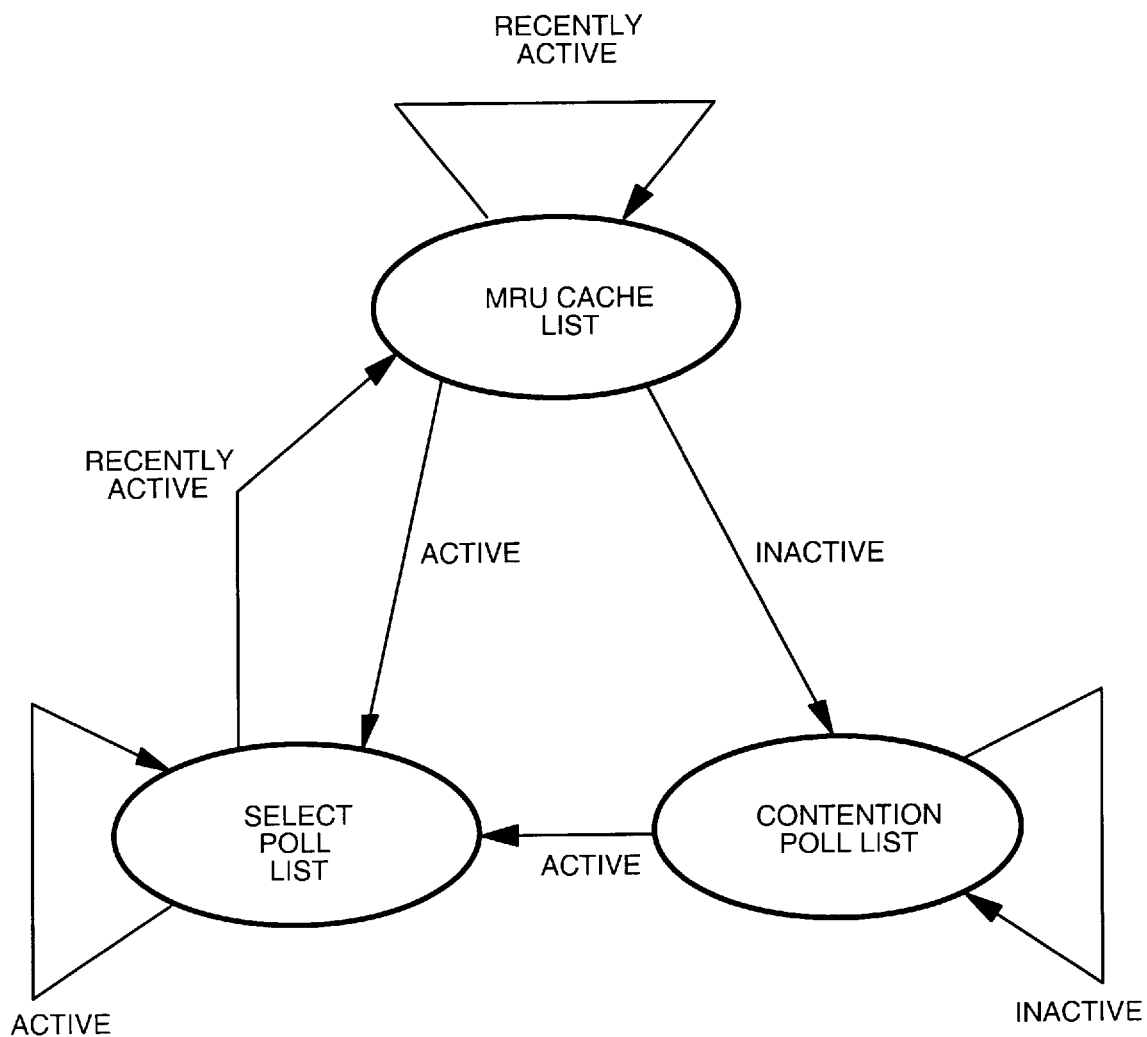
FIG. 9 is a state transition diagram for maintaining the select poll list, the MRU cache list, and the contention poll list in accordance with an embodiment of the present invention.

FIG. 9 shows a state transition diagram for maintaining the three poll lists. The headend unit sends SPolls to MAC Users on the select poll list, and the "active" MAC Users are left on the select poll list. MAC Users that become "inactive" are moved into the MRU cache list instead of being dropped into the contention poll list. MAC Users in the MRU cache list are permitted to respond to LCPolls. However, unlike for MAC Users on the contention poll list, if a collision occurs, the MAC Users in the MRU cache list are selectively polled and do not participate in collision resolution. Upon being selectively polled, each MAC User that becomes "active" is placed back on the select poll list, and each MAC User that remains "inactive" is left on the MRU cache list for a predetermined number of SPolls, after which it is dropped onto the contention poll list.

Because the MAC Users on the MRU cache list may respond to LCPolls, LCPolls are not used during collision resolution. Instead, a special collision resolution poll (CRPoll) is used. The CRPoll allows the headend unit to limit the MAC Users that may contend during collision resolution to only MAC Users that are on the contention poll list. Thus, by using the CRPoll, MAC Users in the MRU cache list are prevented from contending during collision resolution.

In an exemplary embodiment, the MRU cache list is used only for collision resolution by the headend unit. MAC Users maintain the two-state state machine as shown in FIG. 2, and respond as usual to LCPolls (i.e., a MAC User responds to the LCPoll if it is in the INACTIVE state, it is in the specified group, and it is has data to transmit). In the event of a collision, the headend unit first sends SPolls to any MAC Users that are within the group specified in the LCPoll and are also in the MRU cache list, and then performs collision resolution on the remaining MAC Users within the group. The headend unit includes a poll mode transition field in each SPoll to control the state transitions of the MAC User.

Figure 10:
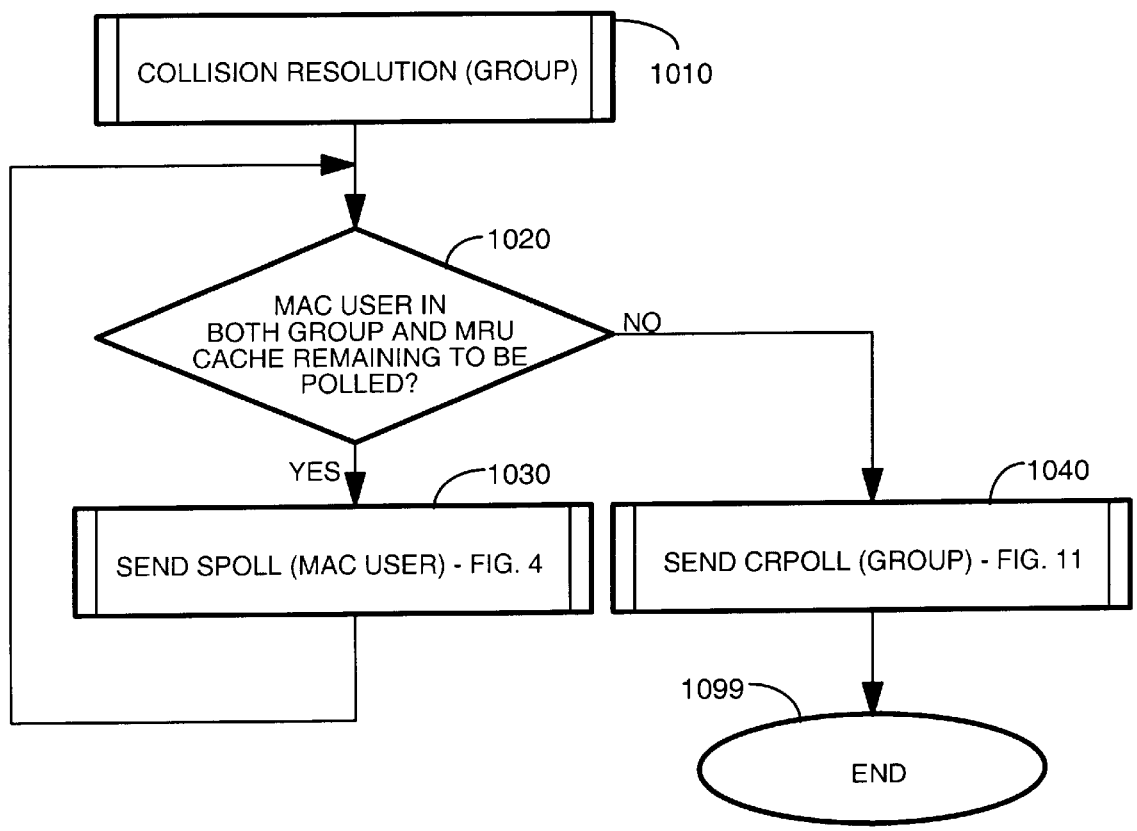
FIG. 10 is a logic flow diagram for collision resolution in accordance with an embodiment of the present invention.

Exemplary collision resolution logic is shown in FIG. 10. When a collision is detected in response to a LCPoll, the collision resolution logic begins in step 1010 and proceeds to step 1020, where it determines whether or not all MAC Users that are in both the specified group and the MRU cache list have been selectively polled. If a MAC User remains to be selectively polled (YES in step 1020), then the logic sends a SPoll to the MAC User, in step 1030, by invoking the logic described in FIG. 4. When all such MAC Users have been selectively polled (NO in step 1020), the logic performs collision resolution using CRPolls (described in FIG. 11 below) for the remaining MAC Users in the group.

Figure 11:
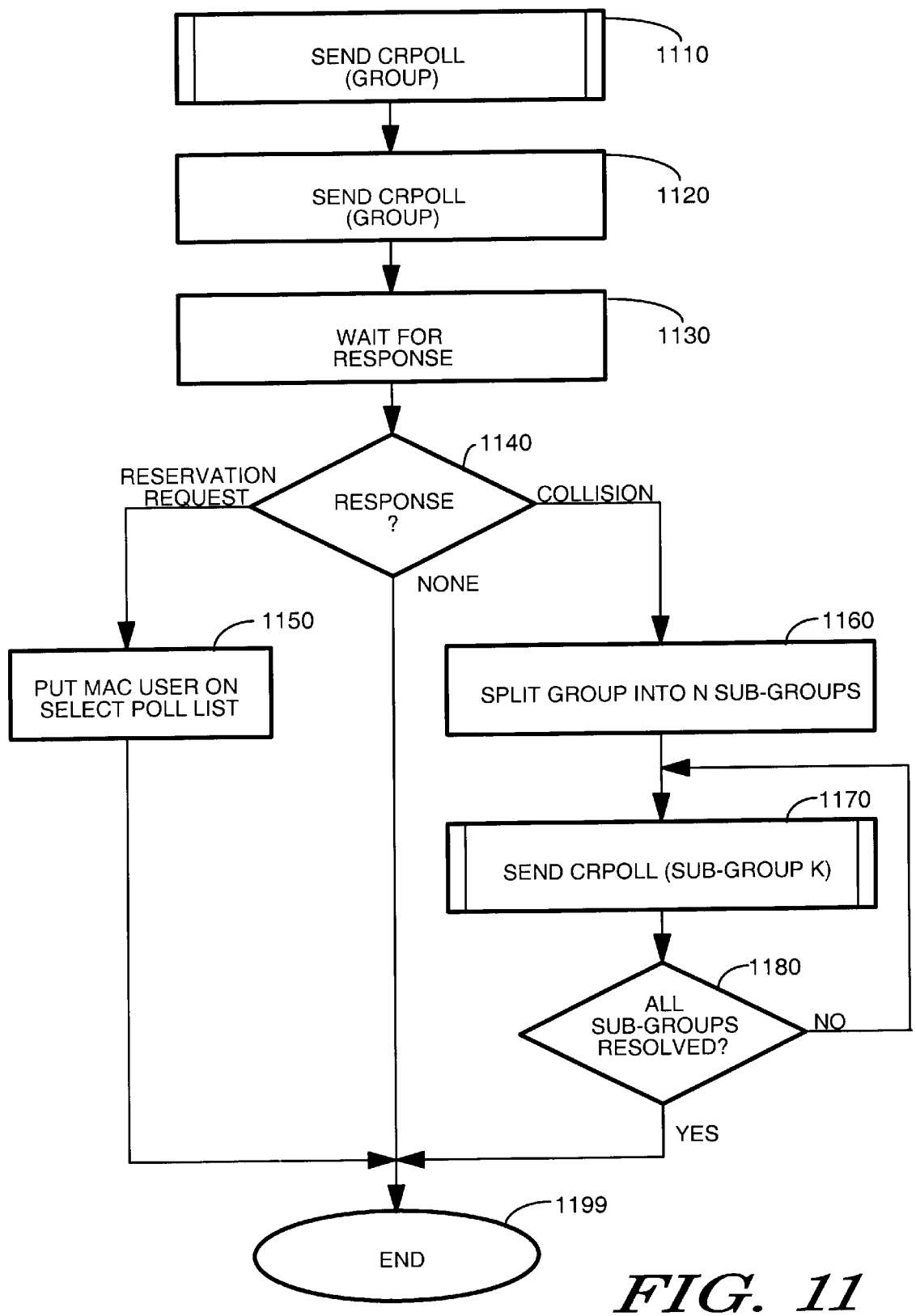
FIG. 11 is a logic flow diagram for sending a CRPoll by the headend unit in accordance with an embodiment of the present invention.

FIG. 11 shows logic for sending a CRPoll by the headend unit. The logic begins in step 1110 and proceeds to send the CRPoll addressed to the specified group of MAC Users, in step 1120. The logic then waits for a response, in step 1130. If a reservation request is received in step 1140, then the logic puts the responding MAC User in the select poll list, in step 1150. If a collision is detected in step 1140, then the logic splits the specified group of MAC Users into a pre-determined number N of sub-groups, in step 1160. Then, for each sub-group k, the logic sends a CRPoll to the sub-group by invoking anew the logic for sending a CRPoll (i.e., the logic presently described), in step 1170. When collision resolution for all N sub-groups is complete (YES in step 1180), the logic terminates in step 1199.

In sending a CRPoll, the headend unit provides an opportunity for a number of MAC Users in the contention poll list to contend for a reservation. Upon receipt of a CRPoll, a MAC User must decide whether or not it is permitted to respond to the CRPoll. The MAC User has no explicit knowledge of which list (i.e., the MRU cache list or the contention poll list) it is in, since the MAC User maintains only its ACTIVE/INACTIVE status. However, the MAC User can infer its categorization from the polling sequence transmitted by the headend unit. As described above, upon detecting a collision in response to a LCPoll, the headend unit selectively polls the MAC Users on the MRU cache list, and then sends CRPolls to the MAC Users on the contention poll list. The MAC User can infer that it is in the contention poll list, and therefore permitted to respond to the CRPoll (if other conditions are met), if, after receiving an LCPoll addressed to the MAC User's group, a CRPoll addressed to the MAC User's group is received without the MAC User having been selectively polled in the interim period between the LCPoll and the CRPoll.

Figure 12:
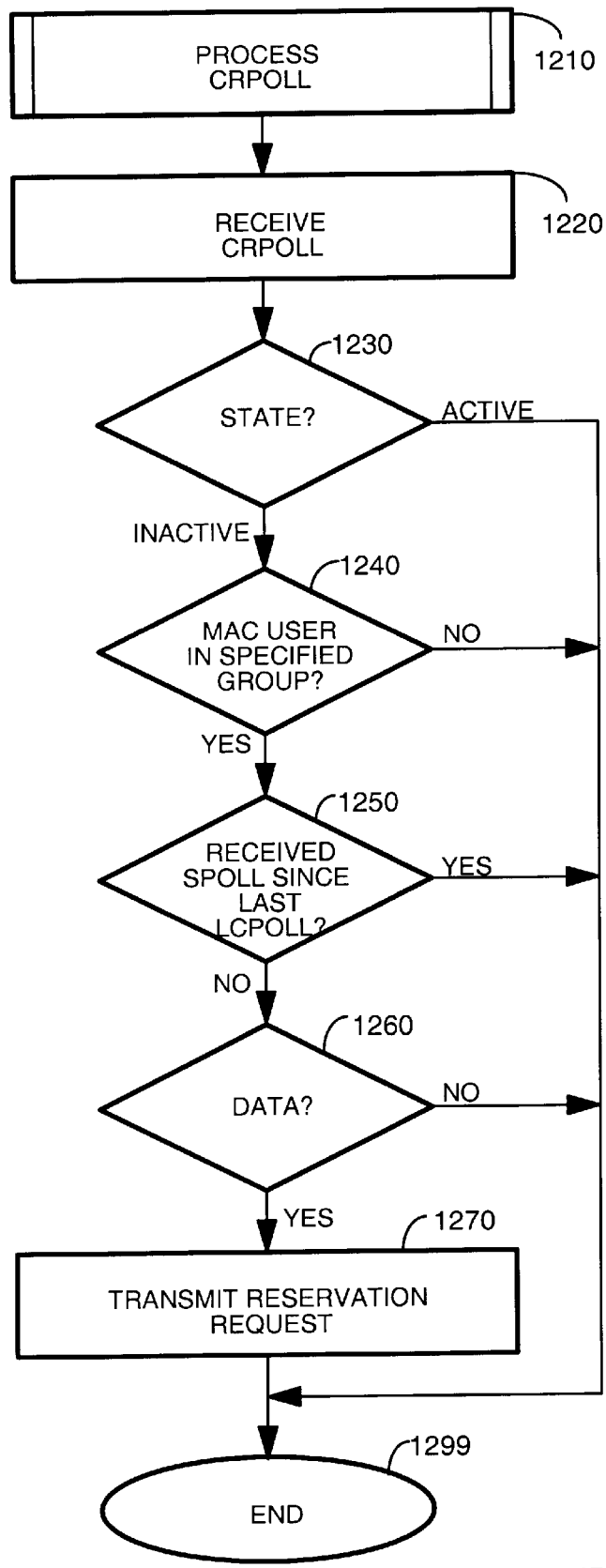
FIG. 12 is a logic flow diagram for processing a CRPoll by the MAC User in accordance with an embodiment of the present invention.

FIG. 12 shows logic for processing a CRPoll by the MAC User. The logic begins in step 1210 and, upon receiving a CRPoll in step 1220, proceeds to step 1230 where it checks the MAC User state to determine whether or not to process the CRPoll. If the MAC User state is ACTIVE in step 1230, then the logic terminates in step 1299 without processing the CRPoll. If the MAC User state is INACTIVE in step 1230, then the logic proceeds to step 1240 where it determines whether or not the MAC User is in the specified group. If the MAC User is not in the specified group (NO in step 1240), then the logic terminates in step 1299. If the MAC User is in the specified group (YES in step 1240), then the logic proceeds to step 1250 where it determines whether or not a SPoll was received since the last LCPoll. If a SPoll was received since the last LCPoll (YES in step 1250), then the logic terminates in step 1299. If no SPoll was received since the last LCPoll (NO in step 1250), then the logic proceeds to step 1260 where it determines whether or not the MAC User has data to transmit. If the MAC User has no data to transmit (NO in step 1260), then the logic terminates in step 1299. If the MAC User has data to transmit (YES in step 1260), then the logic transmits a reservation request, in step 1270, and terminates in step 1299.

The hybrid contention/polling protocol as described in the above embodiment uses the MRU cache list to supplement the select poll list and the contention poll list. No limitations are placed on the select poll list, and the select poll list may continue to be implemented as a hierarchy of lists (e.g., a fast poll list and a medium poll list). However, because the function of the MRU cache list is to get MAC Users off of the select poll list as early as possible and yet respond quickly to those recently active MAC Users that generate data immediately, it is preferable that the select poll list be a single list and that the MRU cache list be used in place of the medium poll list.

The exemplary logic described above utilizes explicit control of the MAC User state transitions by the headend unit. However, it will be apparent to a skilled artisan how the logic is modified to use implicit control of the MAC User state transitions directly by the MAC User.

The exemplary logic shown in the figures and described throughout the specification are intended only to facilitate discussion and understanding of the described embodiments and are not intended to fully characterize any protocol implementation. For convenience and clarity, many details of a full protocol implementation are intentionally omitted. Such details will be apparent to a skilled artisan.

The present invention may be embodied in other specific forms without departing from the spirit or essential characteristics. The described embodiments are to be considered in all respects only as illustrative and not restrictive.

What is claimed is:

1. A method for controlling transmissions by a plurality of users on a shared medium, the method comprising the steps of:

maintaining a first list of users that are active;

maintaining a second list of users that are inactive;

maintaining a third list of users that are inactive but have been active within a predetermined interval;

sending a first group-addressed poll message addressed to a first specified group of users in the second list and a second specified group of user in the third list;

authorizing the first and second specified groups of users to transmit on the shared medium; and when more than one user responds to the first group-addressed poll message, sending an individually-addressed poll message to each user in the second specified group of users, and then subsequently sending a second group-addressed poll message authorizing the users in the first specified group of users transmit on the shared medium.

2. The method of claim 1 further comprising the steps of:

when only one user responds to the first group-addressed poll message moving the responding user to the first list.

3. The method of claim 1 further comprising the steps of:

subsequent to sending the individually-addressed poll message to one of the users in the second specified group of users, determining whether the user in second specified group of users responded to the individually-addressed poll message by transmitting a message with data; and if the user in the second specified group of users responded by transmitting a data message, moving the user from the third list to the first list.

4. The method of claim 3 further comprising the step of:

if the user in the second specified group of users responded to the individually-addressed poll message by transmitting a negative acknowledgement message, moving the user from the third list to the second list.

5. The method of claim 1 further comprising the steps of:

receiving the second group-addressed poll message by a user in the first and second specified groups of users;

determining whether the user is in one of an active state and an inactive state; and if the user is in the inactive state, ignoring the second group-addressed poll message if an individually-addressed poll message was received since the first group-addressed poll was received.

6. A device for controlling transmissions by a plurality of users on a shared medium, the device comprising:

logic circuitry for maintaining a first list of users that are active;

logic circuitry for maintaining a second list of users that are inactive;

logic circuitry for maintaining a third list of users that are inactive but have been active within a predetermined interval;

logic circuitry for sending a first group-addressed poll message addressed to a a first specified group of users in the second list and a second specified group of users in the third list;

logic circuitry for authorizing the first and second specified groups of users to transmit on the shared medium; and logic circuitry for sending an individually-addressed poll message to each user in the second specified group of users when more than one user responds to the first group-addressed poll message, and then subsequently sending a second group-addressed poll message authorizing the first specified group of users to transmit on the shared medium.

7. The device of claim 6 further comprising:

logic circuitry for moving the responding user to the first list when only one user responds to the first group-addressed poll message.

8. A device for supporting a user having data to transmit in an improved hybrid contention/polling protocol over a shared medium, the device comprising:

logic circuitry for receiving a first group-addressed poll message addressed to a specified group of users authorizing the specified group of users to transmit on the shared medium;

logic circuitry for determining whether a user in the specified group of users is in one of an active state and an inactive state;

logic circuitry for transmitting a response to the first group-addressed poll message, if the user is in the inactive state and the user is in the specified group of users;

logic circuitry for receiving an individually-addressed poll message;

logic circuitry for receiving a second group-addressed poll message authorizing only a portion of the specified group of users authorized by the first group-addressed poll message to transmit on the shared medium; and logic circuitry for ignoring the second group-addressed poll message, if the user is in the inactive state and an individually-addressed poll message was received since receiving the first group-addressed poll message.

9. A system having a single headend unit in communication with at least one Access Interface Unit (AIU) by means of a shared medium, each AIU supporting at least one user, the system utilizing a method for controlling transmissions by the plurality of users on the shared medium comprising the steps of:

by the headend unit:

maintaining a first list of users that are active;

maintaining a second list of users that are inactive;

maintaining a third list of users that are inactive but have active within a predetermined interval;

moving a user in the first list to the third list if the user in the first has no data to transmit;

sending a first group-addressed poll message addressed to a first specified group of users in the second list and a second specified group of users in the third list authorizing the first and second specified groups of users to transmit on the shared medium;

determining a number of users responding to the first group-addressed poll message;

if the number of responding users is exactly one, moving the responding user to the first list; and if the number of responding users is greater than one:

sending an individually-addressed poll message to each users in the second specified group of users; and sending a second group-addressed poll message authorizing only the first specified group of users to transmit on the shared medium; and by the AIU:

receiving the first group-addressed poll message addressed to the first and second specified groups of users authorizing the the first and second specified groups of users to transmit on the shared medium;

determining whether the user is in one of an active state and an inactive state;

transmitting a response to the first group-addressed poll message, if the user is in the inactive state and the user is in one of the specified groups;

receiving an individually-addressed poll message;

receiving a second group-addressed poll message authorizing only the first specified group of users to transmit on the shared medium; and ignoring the second group-addressed poll message, if the user is in the inactive state and an individually-addressed poll message was received since receiving the first group-addressed poll message.

10. The method of claim 1 further comprising:

sending an individually-addressed poll message to a user in the first list;

receiving a response from the user in the first list; and moving the user in the first list to the third list if the response indicates that the user has no data to transmit.

11. The method of claim 1 wherein the individually-addressed poll message includes a state transition indicator indicating one of an active state and an inactive state, and wherein the step of sending the individually-addressed poll message comprises the steps of:

determining the state transition indicator for the user;

sending the individually-addressed poll message including the state transition indicator;

receiving a response from the user;

if the response is a data message, moving the user to the first list;

if the response is a negative acknowledgement message:

moving the user to the first list if the state transition indicator indicates the active state; and moving the user to the second list if the state transition indicator indicates the inactive state.

12. The method of claim 11 wherein the step of determining the user state transition comprises setting the user state transition to indicate the inactive state if the user has no data to transmit and the user is in one of the following lists: the second list and the third list.

13. The method of claim 11 wherein the step of determining the user state transition comprises setting the user state transition to indicate the active state if the user is in the first list and it is determined that the user should remain in the active state regardless if the user has data to transmit.

14. The device of claim 6 further comprising:

logic circuitry for sending an individually-addressed poll message to a user in the first list;

logic circuitry for receiving a response from the user in the first list; and logic circuitry for moving the user in the first list to the third list if the response indicates that the user has no data to transmit.

15. The device of claim 6 further comprising:

logic circuitry for sending a first group-addressed poll message addressed to a number of users in the second list and authorizing the number of users in the second list and all of the users in the third list to transmit on the shared medium.

16. The device of claim 6 further comprising:

logic circuitry for determining a number of users responding to the first group-addressed poll message;

logic circuitry for moving the responding user to the first list if the number of responding users is exactly one; and logic circuitry for sending an individually-addressed poll message to each of the users in the third list and for sending a second group-addressed poll message authorizing only the users in the second list authorized by the first group-addressed poll message to transmit on the shared medium if the number of responding users is greater than one.

* * * * *